US010911385B2

(12) United States Patent
Ji et al.

(10) Patent No.: US 10,911,385 B2
(45) Date of Patent: Feb. 2, 2021

(54) METHOD AND SYSTEM FOR SYNCHRONIZING INSTANT MESSAGES BETWEEN MULTIPLE CLIENTS

(71) Applicant: TENCENT TECHNOLOGY (SHENZHEN) COMPANY LIMITED, Guangdong (CN)

(72) Inventors: Chao Ji, Shenzhen (CN); Gang Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 313 days.

(21) Appl. No.: 15/166,866

(22) Filed: May 27, 2016

(65) Prior Publication Data
US 2016/0277343 A1 Sep. 22, 2016

Related U.S. Application Data

(63) Continuation of application No. PCT/CN2015/080172, filed on May 29, 2015.

(30) Foreign Application Priority Data

Jul. 16, 2014 (CN) .......................... 2014 1 0338910

(51) Int. Cl.
*H04L 12/58* (2006.01)
*G06F 3/0482* (2013.01)
(Continued)

(52) U.S. Cl.
CPC ............ *H04L 51/16* (2013.01); *G06F 3/0482* (2013.01); *G06F 3/0485* (2013.01); *G06F 3/04883* (2013.01); *H04L 51/04* (2013.01)

(58) Field of Classification Search
CPC ............................... H04L 51/16; G06F 3/0482
See application file for complete search history.

(56) References Cited

U.S. PATENT DOCUMENTS

2006/0277504 A1* 12/2006 Zinn ...................... G06F 3/0482
715/864
2012/0059887 A1 3/2012 Oberle
(Continued)

FOREIGN PATENT DOCUMENTS

CN 101083687 A 12/2007
CN 102638419 A 8/2012
(Continued)

OTHER PUBLICATIONS

International Search Report in international application No. PCT/CN2015/080172, dated Sep. 6, 2015.
(Continued)

*Primary Examiner* — Scott T Baderman
*Assistant Examiner* — Steve P Golden
(74) *Attorney, Agent, or Firm* — Morgan, Lewis & Bockius LLP

(57) ABSTRACT

A method of synchronizing the display of instant messages between multiple clients is performed at a computer system. Upon receipt of a first synchronization request from a client, the first synchronization request including a conversation identifier and a last message timestamp, the computer system identifies a conversation including a set of messages associated with the conversation identifier. The set of messages was generated after the last message timestamp and have not been received by the client. The computer system then assigns display parameters to the set of messages based on their read-or-not indicators, content, and their temporal relationship with other messages in the conversation. Next, the computer system sends the set of messages and their respective display parameters to the client in a reverse (Continued)

chronological order. The client then displays the set of messages in accordance with their respective display parameters.

16 Claims, 8 Drawing Sheets

(51) Int. Cl.
*G06F 3/0485* (2013.01)
*G06F 3/0488* (2013.01)

(56) References Cited

U.S. PATENT DOCUMENTS

| | | | | |
|---|---|---|---|---|
| 2012/0072835 | A1* | 3/2012 | Gross | G06Q 10/10 |
| | | | | 715/243 |
| 2012/0149342 | A1* | 6/2012 | Cohen | H04L 51/24 |
| | | | | 455/412.2 |
| 2012/0197937 | A1* | 8/2012 | Kakarla | G06F 17/30395 |
| | | | | 707/772 |
| 2012/0317499 | A1* | 12/2012 | Shen | H04L 51/04 |
| | | | | 715/752 |
| 2013/0132828 | A1* | 5/2013 | Qu | G06F 17/211 |
| | | | | 715/243 |

FOREIGN PATENT DOCUMENTS

| | | |
|---|---|---|
| CN | 102843361 A | 12/2012 |
| CN | 102882762 A | 1/2013 |
| CN | 103051520 A | 4/2013 |
| CN | 103069755 A | 4/2013 |
| CN | 103139259 A | 6/2013 |
| CN | 104144116 A | 11/2014 |

OTHER PUBLICATIONS

English Translation of the Written Opinion of the International Search Authority in international application No. PCT/CN2015/080172, dated Sep. 6, 2015.
Notification of the First Office Action of Chinese application No. 201410338910.0, dated Aug. 27, 2015.

* cited by examiner

METHOD AND SYSTEM FOR SYNCHRONIZING INSTANT MESSAGES BETWEEN MULTIPLE CLIENTS

CROSS REFERENCE TO RELATED APPLICATIONS

This is a continuation application of International Patent Application No. PCT/CN2015/080172, filed on May 29, 2015, which claims priority to Chinese Patent Application No. 201410338910.0 entitled "INSTANT MESSAGING METHOD AND INSTANT MESSAGING SYSTEM" filed on Jul. 16, 2014, which are incorporated herein by reference in their entirety.

TECHNICAL FIELD

The present application relates to the field of instant messaging, and in particular, to method and system for synchronizing instant messages between multiple clients.

BACKGROUND

Instant Messaging (IM) realizes online real-time communication, and presently, is widely used in life and in business. In terms of technical level, IM makes information pass through different gateways without limits, thereby realizing active response of a client to information without a receiving operation of the client. In the process of actual use, an IM application often needs to be run on different devices, so synchronization of the IM application between multiple devices is very important. As for current IM, some synchronization between multiple devices is realized. But often, the latest several pieces of information received by a user are pushed again, so that this manner causes two problems to occur: one is that the re-pushed several pieces of information (including information having been read previously) appear in the form of unread communication information; the other one is that after replacing the device to use the IM application, the user may forget the previous words or communication information, and therefore, synchronization of communication scenarios cannot be realized.

SUMMARY

The above deficiencies and other problems associated with the conventional approach of synchronizing the display of messages between multiple clients are reduced or eliminated by the invention disclosed below. In some embodiments, the present application is implemented in a computer system (e.g., computer server, etc.) that has one or more processors, memory and one or more modules, programs or sets of instructions stored in the memory for performing multiple functions. Instructions for performing these functions may be included in a computer program product configured for execution by one or more processors and stored in a non-transitory computer readable medium.

One aspect of the present application involves a computer-implemented method of synchronizing the display of instant messages between multiple clients performed at a computer system. Upon receipt of a first synchronization request from a client, the first synchronization request including a conversation identifier and a last message timestamp, the computer system identifies a conversation including a set of messages associated with the conversation identifier. The set of messages was generated after the last message timestamp and have not been received by the client. The computer system then assigns display parameters to the set of messages based on their read-or-not indicators, content, and their temporal relationship with other messages in the conversation. Next, the computer system sends the set of messages and their respective display parameters to the client in a reverse chronological order. The client then displays the set of messages in accordance with their respective display parameters.

Another aspect of the present application involves a computer system including memory, one or more processors, and one or more program modules stored in the memory and configured for execution by the one or more processors to perform the method described above.

Yet another aspect of the present application involves a non-transitory computer readable storage medium having stored therein one or more programs for execution by one or more processors of a computer system. The one or more programs include instructions, when executed by the one or more processors, cause the processors to perform the operations as described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The content of the present application is further described below with reference to specific embodiments and drawings. It should be noted that, for concise description, sent information mentioned in the following description refers to communication information whose sender is the current client, and received information refers to communication information whose recipient is the current client, where the sent information includes information sent to individuals by the current client in a one-to-one communication mode, and also includes group information sent by the current client in a group communication mode; the received information includes communication information sent by individuals and received by the current client in the one-to-one communication mode, also includes group information received in the group communication mode, and further includes system information sent by a server and received by the current client.

Embodiment 1

Figure 1:
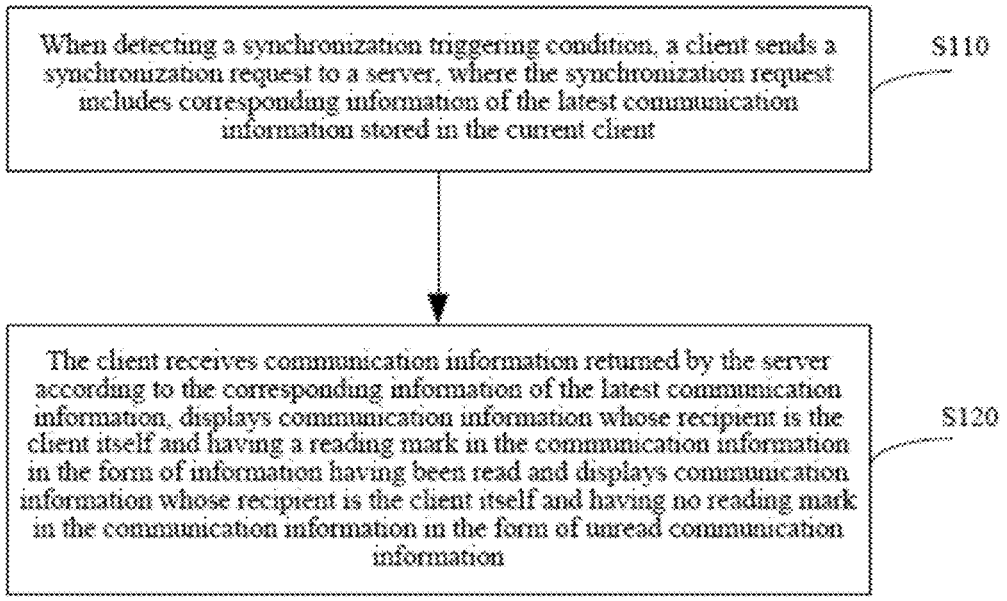
FIG. 1 is a schematic flow chart of a process performed by a client according to Embodiment 1 of an instant messaging method of the present application.

FIG. 1 is a schematic flow chart of Embodiment 1 of an instant messaging method of the present application. In Embodiment 1, a process performed by a client is taken as an example for illustration.

As shown in FIG. 1, the process of the client includes the following steps:

S110: When detecting a synchronization triggering condition, a client sends a synchronization request to a server, where the synchronization request includes corresponding information of the latest communication information stored in the current client.

S120: The client receives communication information returned by the server according to the corresponding information of the latest communication information, displays communication information whose recipient is the client itself and having a reading mark in the communication information in the form of information having been read, and displays communication information whose recipient is the client itself and having no reading mark in the communication information in the form of unread communication information.

In the process of instant messaging, if a user switches from a previous communication device to the current communication device, in order to ensure continuity of the communication, synchronization processing of the communication information needs to be performed on the client on the current device. First, the client on the current device detects whether there is a synchronization triggering condition, for example, the user performs a touch action on a screen of the current device, and if the touch action of the user is a preset trigger action, the current client determines that the synchronization triggering condition is met, and automatically sends a synchronization request to the server. The synchronization request includes corresponding information of the latest communication information stored in the current client, the corresponding information and the latest communication information has a preset one-to-one corresponding relation, and the server can known, according to the corresponding information, the latest communication information stored in the current client. Presently, instant messaging between various smart devices is completed through server transit, and therefore, the server stores all communication information of the user. Therefore, after knowing the latest communication information stored in the current client, the server compares the communication information stored in the server and the latest communication information stored in the current client, and in combination with the synchronization request, so as obtain the communication information to be sent to the client, and the client on the current device receives and displays the communication information.

The communication information includes communication information whose recipient is the current client and communication information whose sender is the current client, which has been mentioned above. From the perspective of the current client, the former is referred to as received information, and the later is referred to as sent information. The reading mark is used for recording a reading state of a received message, and if a received message has a reading mark, it indicates that the received message has been read by the user. The client can display the communication information returned by the server differentially according to the reading mark, namely, the client displays the received information having a reading mark in the communication information in the form of information having been read, and displays the received information having no reading make in the form of unread communication information in the prior art, for example, a picture prompt, a sound prompt or the like may be carried.

In an implementation manner, the client may further send the reading mark of the received information having been read to the server, so that the server can record the reading state of the communication information.

The synchronization triggering condition is diverse, for example, when the current device is connected to a local area network or wireless Internet network, the client automatically sends the synchronization request for synchronization of communication information, that is, pulling the communication information in advance; when the current device is connected to a wireless mobile network, in order to save traffic, the client does not automatically send the synchronization request, and merely when the user performs a specific operation, the client sends the synchronization request.

According to the solution of this embodiment, the client receives the communication information returned by the server and the reading state of the communication information, and displays the communication information differentially, so as to realize synchronization of communication scenarios when the user switches between multiple devices, so that the user does not feel the pause and interference of instant messaging.

Embodiment 2

Figure 2:
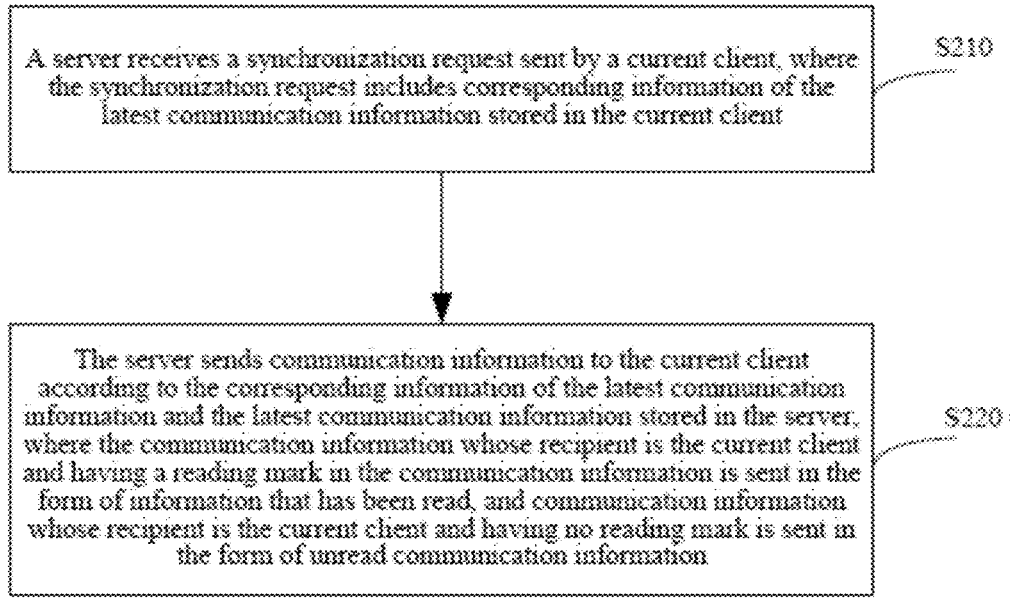
FIG. 2 is a schematic flow chart of a process performed by a server according to Embodiment 2 of an instant messaging method of the present application.

FIG. 2 is a schematic flow chart of Embodiment 2 of an instant messaging method of the present application. In Embodiment 2, a process performed by a server is taken as an example for illustration.

As shown in FIG. 2, the process of the server includes the following steps:

S210: A server receives a synchronization request sent by a current client, where the synchronization request includes corresponding information of the latest communication information stored in the current client.

S220: The server sends communication information to the current client according to the corresponding information of the latest communication information and the latest communication information stored in the server, where the communication information whose recipient is the current client and having a reading mark in the communication information is sent in the form of information having been read, and communication information whose recipient is the current client and having no reading mark is sent in the form of unread communication information.

The server receives the synchronization request sent by the current client, where the synchronization request includes corresponding information of the latest communication information stored in the current client, and according to this corresponding information, the server can obtain the latest communication information stored in the current client. Because the server stores all communication information of the user, the server merely needs to find the latest communication information stored in the server and compares the latest communication information stored in the server with the latest communication information stored in the current client, and in combination with the synchronization request of the user, the server can obtain the communication information to be sent to the current client. The server sends the communication information to the current client, and at the same time, the communication information carries reading state information of the communication information. The reading state is reflected by a reading mark, and if the received information in the communication information has a reading mark, it indicates that the received information has been read. The client displays the communication information sent by the server differentially according to the reading mark, and as for the specific displaying method, reference may be made to the process of the client in Embodiment 1.

In an implementation manner, the server may receive the reading mark of the received information having been read sent by the current client, and record the reading state of the communication information. The server may further actively generate a reading mark, specifically, the server generates a corresponding reading mark for all received information between each two pieces of sent information of the current client, or the server generates a reading mark for received information that has a generation time before the received information having a reading mark and has no reading mark, or the two solutions are combined, so as to fully realize recording of the reading state of the communication information.

Additionally, the server may manage the stored communication information, and restrict storage of the communication information according to two latitudes of time and space. For example, the server deletes the communication information having a storage time exceeding a preset time and/or restricts the storage capacity of the server, and if the storage amount of the communication information in the server exceeds a preset value, when storing new communication information, the server overwrites communication information that has been stored in the server, for example, overwrites communication information having a early generation time with new communication information.

Figure 3:
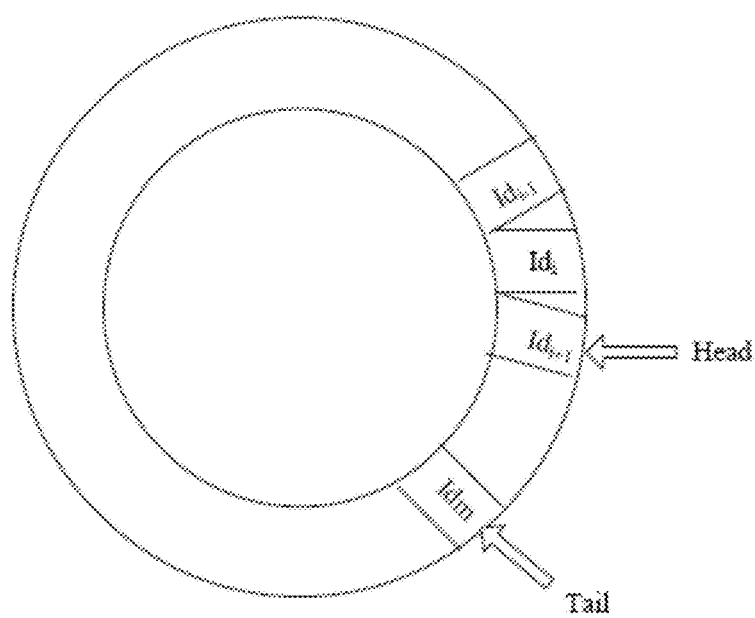
FIG. 3 is a schematic diagram of a circular queue according to Embodiment 2 of an instant messaging method of the present application.

Therefore, the server may adopt a circular queue to store the communication information. FIG. 3 is a schematic diagram of a circular queue, in which according to the order of generation time, communication information having the earliest generation time is stored at the head of the queue, and newly generated communication information is stored at the tail of the queue. When the storage amount exceeds a storage upper limit, the communication information having the earliest generation time at the head of queue is overwritten by the new communication information at the tail of the queue, thus realizing restriction on the storage capacity of the server.

Embodiment 3

Figure 4:
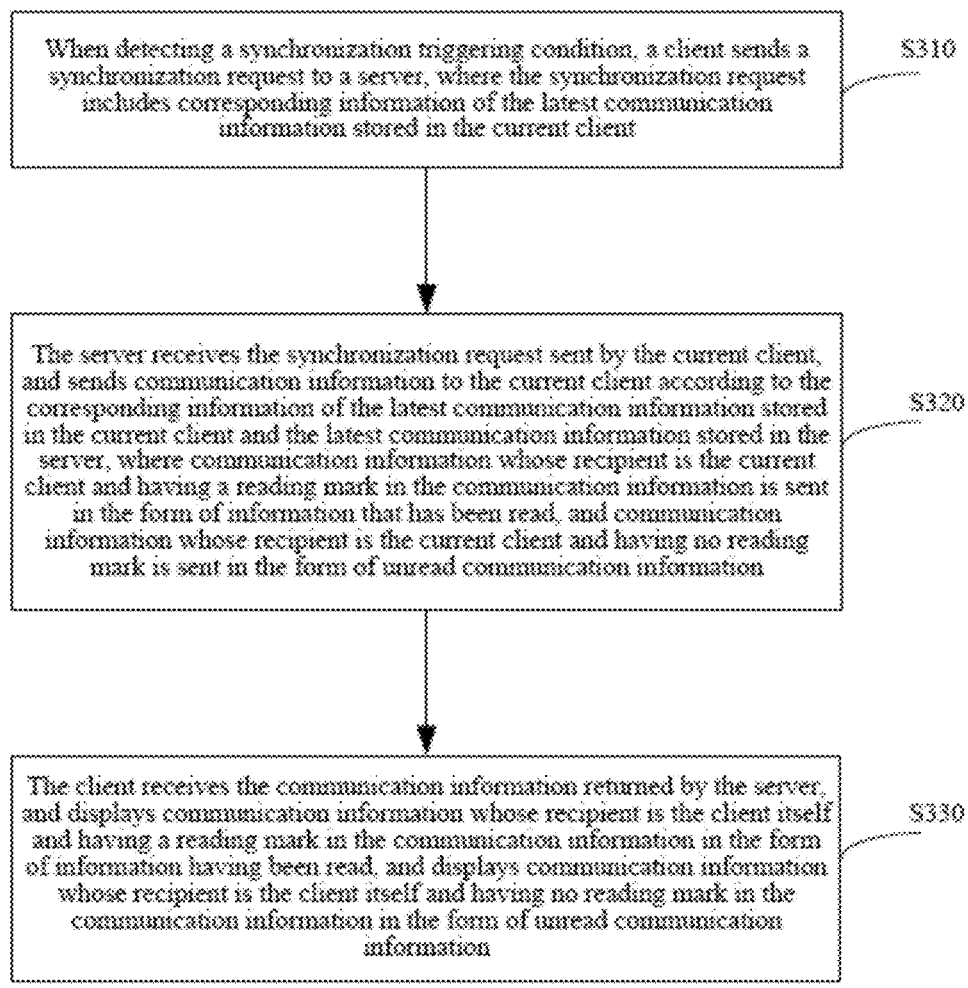
FIG. 4 is a schematic flow chart of an interaction process of a client and a server according to Embodiment 3 of an instant messaging method of the present application.

In combination with the solutions in Embodiment 1 and Embodiment 2, FIG. 4 is a schematic flow chart of Embodiment 3 of an instant messaging method of the present application. In this embodiment, a two-way interaction process between a server and a client upon instant messaging is taken as an example for illustration, but the illustration is not used to limit the solutions of the present application.

As shown in FIG. 4, in Embodiment 3, the method of this embodiment includes the following steps:

S310: When detecting a synchronization triggering condition, a client sends a synchronization request to a server, where the synchronization request includes corresponding information of the latest communication information stored in the current client; and S320 is performed.

S320: The server receives the synchronization request sent by the current client, and sends communication information to the current client according to the corresponding information of the latest communication information stored in the current client and the latest communication information stored in the server, where communication information whose recipient is the current client and having a reading mark in the communication information is sent in the form of information having been read, and communication information whose recipient is the current client and having no reading mark is sent in the form of unread communication information; and S330 is performed.

S330: The client receives the communication information returned by the server, and displays communication information whose recipient is the client itself and having a reading mark in the communication information in the form of information having been read, and displays communication information whose recipient is the client itself and having no reading mark in the communication information in the form of unread communication information.

According to the method of this embodiment, after detecting the synchronization triggering condition, the client sends the synchronization request to the server, and the server obtains, according to the synchronization request sent by the client and the communication information stored in the server, the communication information requested by the client. Different from the way of pushing again by using unread communication information in the prior art, in this solution, the received information having a reading mark in the communication information returned by the server is sent in the form of information having been read, the received information having no reading mark is sent in the form of unread communication information, in this way, the previous communication scenario is synchronized on the current device, so that the user may view the previous communication information, and does not feel the pause and interference of instant messaging.

In an example, the synchronization request includes the quantity of request synchronization information and/or the time of request synchronization information, and the server determines the latest communication information stored in the current client according to the corresponding information of the latest communication information stored in the current client in the synchronization request, and then compares the latest communication information stored in the current client with the latest communication information stored in the server, so as to obtain communication information that is absent on the current client. Next, the server determines, according to the quantity of request synchronization information, the time of request synchronization information, or a combination thereof, communication information that finally needs to be sent to the client. In this way, communication information that is absent on the current client and is to be synchronized may be sent based on the quantity or generation time according to the needs of users, for example, 1 piece of communication information is synchronized each time, or communication information in the last hour is synchronized each time.

In an example, the communication information includes a message ID, where each message ID corresponds to a piece of communication information, and the message ID includes a time ID, an information sender ID, an information receiver ID and communication content. Because the communication speed (for example, the speed of chatting) is not high in the process of instant messaging, the time may only accurate to the second grate.

A structure of the message ID is shown as follows:

| Time ID | Information sender ID | Information receiver ID | ... | Communication content |
|---------|----------------------|-------------------------|-----|----------------------|

Because the number of users in instant messaging is far less than the total number of users*the total number of users, in order to shorten the structure of the message ID, a conversation ID may be used to replace the information sender ID and the information receiver ID. In this way, it merely needs to make the conversation ID to correspond to the information receiver ID and the information sender ID. For example, the server treats the correspondence of one conversation ID and both conversation parties. The shortened structure of the message ID is shown as follows:

| Time ID | Conversation ID | ... | Communication content |
|---------|-----------------|-----|----------------------|

In order to further shorten the structure of the message ID, in another example, the communication information may include a message ID and message content, each message ID corresponds to one communication content, as shown in the table below:

| Message ID 1 | Communication content 1 |
| Message ID 2 | Communication content 2 |
| Message ID 3 | Communication content 3 |
| ... | ... |

In this way, the structure of the message ID is unrelated to the communication content, and the data length is short and easy to implement. For example, a structure of the message ID is shown as follows:

| Time ID | Information sender ID | Information receiver ID | ... |
|---------|----------------------|-------------------------|-----| or:

| Time ID | Conversation ID | ... |
|---------|-----------------|-----|

Because there is a one-to-one correspondence between the communication information and the message ID, the communication information may be transmitted by means of the message ID, and moreover, the corresponding information of the latest communication information stored in the current client in the synchronization request may be set as the message ID, and by means of the message ID, the server may determine the latest communication information stored in the current client.

The server determines the communication information that needs to be sent to the client according to the synchronization request, the latest information stored in the current client and the latest communication information stored in the server, where the received information having no reading mark is sent in the form of unread communication information in the prior art, and the received information having a reading mark is sent in the form of information having been read, that is, this type of information is sent without other prompt information such as a picture or sound accompanied.

After receiving the communication information returned by the server, the client displays the received information having no reading mark in the form of unread communication information, for example, the client provides a music prompt, a picture prompt, a vibration prompt or the like; and displays the received information having a reading mark in the form of general information having been read without other information prompt accompanied.

In an implementation manner, the client may further send a reading mark of the received information having been read to the server, so that after receiving the reading mark, the server may record the reading state of the communication information. Additionally, the server may also automatically generate a reading mark, as for specific details, reference may be made to Embodiment 2.

In the following, this embodiment is described with a specific example.

Figure 5:
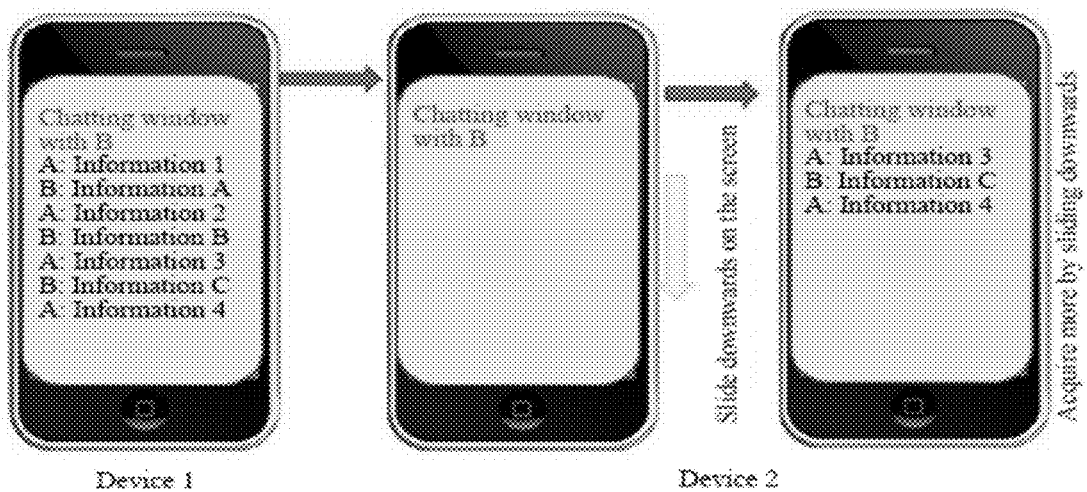
FIG. 5 is a schematic diagram of a usage scenario of a user according to Embodiment 3 of an instant messaging method of the present application.

FIG. 5 is a schematic diagram of a usage scenario of a user. Devices 1 and 2 both have an IM client (such as QQ) installed, a user A uses the device 1 to chat with B, and chatting information including information 1, information A, information 2, information B, information 3, information C and information 4 are generated, where the information 1, the information 2, the information 3 and the information 4 are chatting information sent by A to B (that is, sent information), and the information A, the information B and the information C are chatting information sent by B to A (that is, received information), the chatting information is stored in both the client of the device 1 and the server. After sending the information 4, A switches to the device 2 to continuously chatting with B. After logging in the client on the device 2, at first, A cannot see the previous chatting information with B on the device 1, and at this time, a synchronization operation needs to be performed. First, the client on the device 2 detects whether there is a synchronization triggering condition, for example, A slides down the screen of the device 2, and then the client sends a synchronization request to the server, where the synchronization request includes a message ID of the latest chatting information stored in the client on the device 2, recorded as id_xx. The synchronization request further includes the quantity of request information, where the quantity of request information may be set in advance, and in this example, it is assumed that the quantity of request information is the latest 3 pieces.

After receiving the synchronization request sent by the client on the device 2, the server first views the message ID of the latest chatting information stored in the client on the device 2, and checks a message ID of the latest chatting information stored in the server, which is assumed to be id_server, and chatting information corresponding to the message ID is the information 4. Next, according to the synchronization request, the servers pulls chatting information between id_xx and id_server, and the specific number of pieces of the pulled chatting information is determined according to the quantity of request information in the synchronization request. For example, if id_xx is 9995, and id_server is 10000, the number of pieces of chatting information to be synchronized that is absent on the client on the device 2 is: id_server−id_xx=5

If the quantity of request synchronization information is 3, the number of pieces of pulled chatting information may be selected to be the minimum value 3 in the quantity of request synchronization information and id_server−id_xx. At this time, the server sends the latest 3 pieces chatting information including the information 4, the information C and the information 3 to A. If a situation that the quantity of request information is greater than id_server−id_xx occurs, the synchronized chatting information sent to the client by the server may include empty chatting information or the chatting information that has been stored in the client on the device 2 client previously, or the server determines by default that the number of pieces of chatting information to be sent is the minimum value in the quantity of request information and id_server−id_xx. Through the method described above, if A wants to see more chatting information, A may further slides down the screen continuously and sends a synchronization request, and the client receives more previous chatting information from the server side, where the sequence of the chatting information is maintained the same on different devices.

In the process that A switches between the devices, if B continuously sends chatting information D to A, and the information D is not read by A, but is stored in the server; therefore, when A switches to the device 2 and performs synchronization of chatting information, the server also sends the information D synchronously to the client on the device 2. Because the information D has no reading mark, when the client on the device 2 receives the information D, the client presents the information D in the form of unread communication information to A.

Through the manner described above, the information content of the both chatting parties, the context sequence of the both chatting parties, the chatting information sending time and the chatting information receiving time, the reading state of the chatting information and other information all may be synchronized between devices, so that the user may continue to chart about the previous topic, and does not feel the pause and interference of instant messaging.

Additionally, after A reads the chatting information sent by B on the device 2, the client on the device 2 sends a reading mark of the chatting information having been read to the server. The server may also automatically generate a reading mark, for example, the server generates a corresponding reading mark for all received information between each two pieces of sent information of A, or the server generates a reading mark for received information that has no reading mark and has a generation time before the received information having a reading mark, or the two solutions are combined, so as to fully realize recording of the reading state of the communication information. In this embodiment, for example, the server synchronizes information 5, information E, information F and information G to the client on the device 2 according to the sequence of generation time, where the information E, the information F and the information G are chatting information that are sent to A by B and have not been read by A previously. After A reads the information G, the client on the device 2 sends a reading mark of the information G to the server, and the server receives the reading mark, and then actively generates reading marks for the information E and the information F. Furthermore, for example, the server synchronizes information 6, information H, information I to the client on the device 2 according to the sequence of generation time, where the information H and the information I are chatting information that are sent to A by B and have not been read by A previously, and the information 6 is sent information of A. If A further sends information 7 to B, the server automatically generate reading marks for the information H and the information I between the information 6 and the information 7.

In view of the above, according to the instant messaging method of the present application, the reading state of the communication information is recorded by means of the reading mark, corresponding communication information that the user needs is returned according to the synchronization request of the user, thereby realizing synchronization of communication scenario between different devices, so that the user does not feel the pause and interference of instant messaging. Moreover, through detection of the synchronization triggering condition, in the environment of a local area network or wireless Internet network, the client may automatically send a synchronization request, so as to realize pre-synchronization of communication information and save traffic for the user.

According to the instant messaging method of the present application, the present application further provides an instant messaging system. The instant messaging system of the present application may merely include a client or a server, and may also include a client and a server at the same time. For the convenience of description, taking a combination of a client and a server as an example, FIG. 6 shows a schematic structural diagram of an embodiment of an instant messaging system of the present application.

Figure 6:
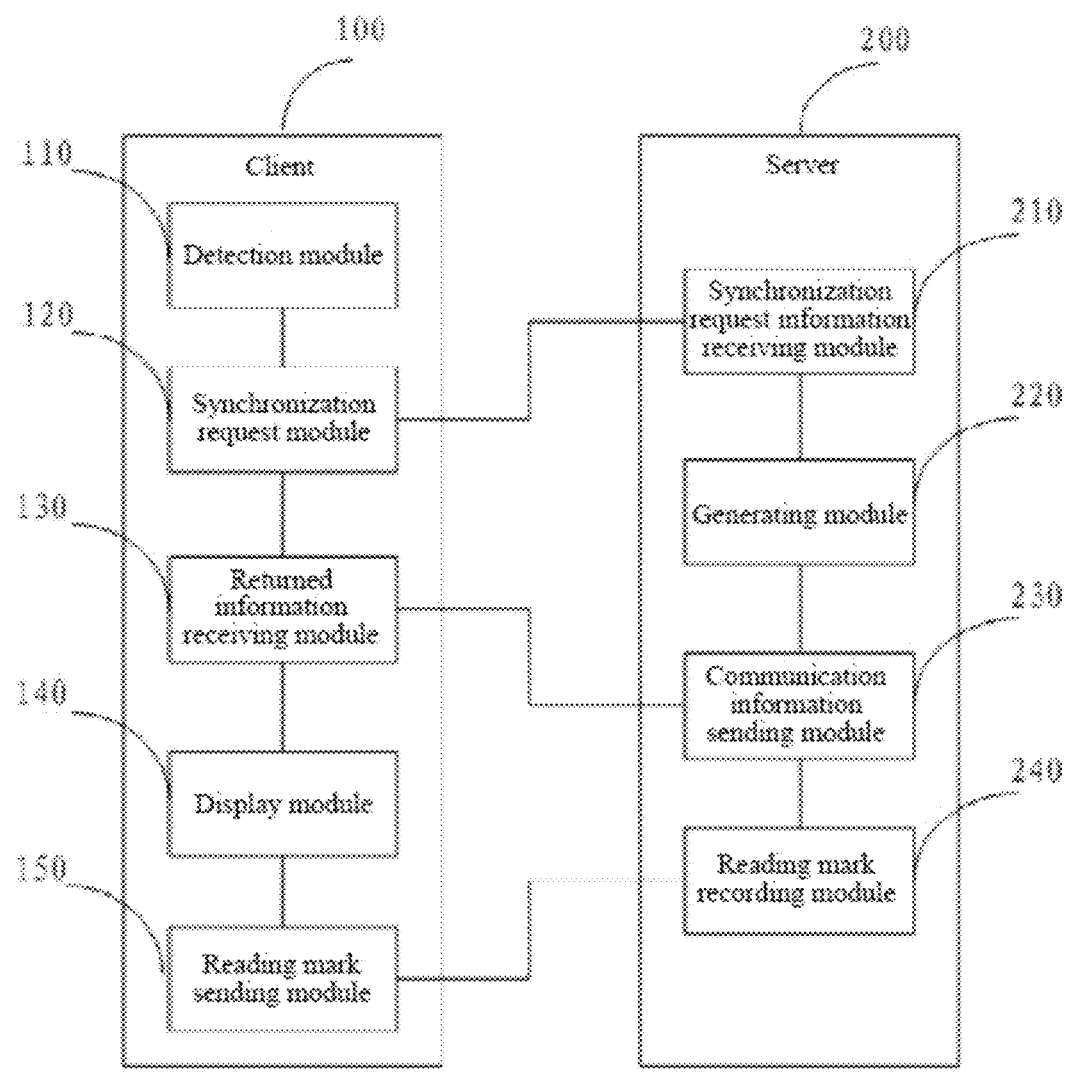
FIG. 6 is a block diagram of an embodiment of an instant messaging system of the present application.

As shown in FIG. 6, a client 100 in the instant messaging system of this embodiment includes:
- a detection module 110, for detecting a synchronization triggering condition;
- a synchronization request module 120, for sending a synchronization request to a server when a synchronization triggering condition is detected, where the synchronization request includes corresponding information of the latest communication information stored in the current client;
- a returned information receiving module 130, for receiving communication information returned by the server according to corresponding information of the latest communication information; and
- a display module 140, for displaying communication information whose recipient is the client itself and having a reading mark in the returned communication information in the form of information having been read, and displaying communication information whose recipient is the client itself and having no reading mark in the returned communication information in the form of unread communication information.

In a specific embodiment, the client 100 further includes a reading mark sending module 150, for sending a reading mark for communication information whose recipient is the client itself and having been read to the server.

In an implementation manner, the synchronization triggering condition is that the current device is connected to a local area network or wireless Internet network, and when the detection module 110 detects that the current device is connected to a local area network or wireless Internet network, the synchronization request module 120 automatically sends the synchronization request.

In another implementation manner, the synchronization triggering condition is that a touch action of a user is a preset trigger action, and when the detection module 110 detects that a touch action of a user is a preset trigger action, the synchronization request module 120 automatically sends the synchronization request.

A server 200 in the instant messaging system of this embodiment includes:

a synchronization request receiving module 210, for receiving a synchronization request sent by a client, where the synchronization request includes corresponding information of the latest communication information stored in the current client;

a generating module 220, for generating, according to the corresponding information of the latest communication information and the latest communication information stored in the server, communication information to be sent to the client; and a communication information sending module 230, for sending communication information whose recipient is the current client and having a reading mark in the communication information sent to the client in the form of information having been read, and sending communication information whose recipient is the current client and having no reading mark in the form of unread communication information.

In a specific embodiment, the server 200 further includes a reading mark recording module 240, for receiving a reading mark of communication information, sent by the current client, whose recipient is the current client and having been read.

In an implementation manner, the reading mark recording module 240 is further used for generating a corresponding reading mark for all communication information whose recipient is the current client between each two pieces of communication information whose sender is the current client, and/or generating a reading mark for communication information whose recipient is the current client, having a generation time before the communication information that has a reading mark and whose recipient is the current client, and having no reading mark.

In another specific embodiment, the server 200 further includes a storage management module, for deleting communication information having a storage time exceeding a preset time, and/or if the storage amount of communication information in the server exceeds a preset value, overwriting communication information that has been stored in the sever when storing communication information having a latter generation time.

In another specific embodiment, the server 200 further includes a circular storage module, for storing communication information by means of a circular queue.

Specific implementation manners of functions of the instant messaging system of the present application may be the same as those in the method of the present application, and will not be described again herein.

Unless otherwise stated clearly by the specification, elements and components in the present application may exist in individual or in multiple, which is not limited in the present application. Although steps in the present application have been arranged with labels, the sequence of the steps are not limited, unless the sequence of steps is stated or it is stated that implementation of some step needs another step as a foundation, otherwise, the relative sequence of steps may be adjusted. It may be understood that the term "and/or" used herein involves and covers one of all associated items or any and all possible combinations of more than one of the associated items.

Figure 7:
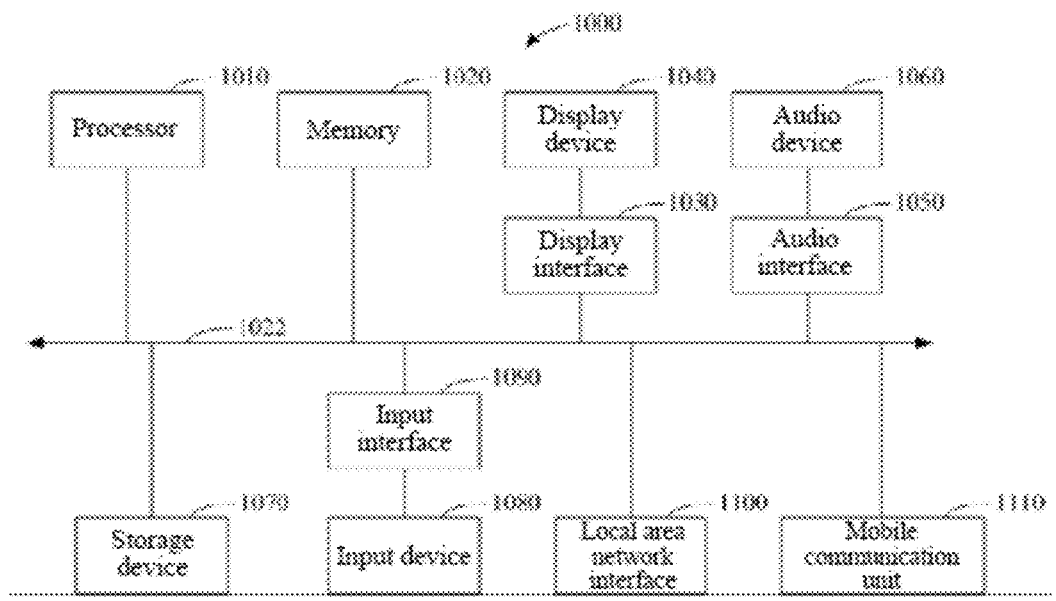
FIG. 7 is a block diagram of a computer system capable of implementing another embodiment of the present application.

FIG. 7 is a block diagram of a computer system 1000 capable of implementing an embodiment of the present application. The computer system 1000 is merely an example suitable for the computer environment of the present application, and should not be construed as any limitation on the application range of the present application. The computer system 1000 should not be construed as needing to rely on or having one part or a combination of multiple parts of the exemplary computer system 1000 in FIG. 7.

The computer system 1000 shown in FIG. 7 is an example suitable for the computer system of the present application. Other architectures having different subsystem configurations may also be used. For example, similar devices such as desktops, laptops, personal digital assistants, smart phones, tablet computers, portable media players and set-top boxes may be applicable for some embodiments of the present application, but the present application is not limited thereto.

As shown in FIG. 7, the computer system 1000 includes a processor 1010, a memory 1020 and a system bus 1022. Various system components including the memory 1020 and the processor 1010 are connected to the system bus 1022. The processor 1010 is hardware for executing computer program instructions through basic arithmetic and logic operations in the computer system. The memory 1020 is a physical device for temporarily or permanently storing computer programs or data (for example, program state information). The system bus 1022 may be any one of the following types of bus structures: a storage bus or storage controller, a peripheral bus and a local bus. The processor 1010 and the memory 1020 may perform data communication through the system bus 1022. The memory 1020 is includes a non-transitory computer readable medium such as read-only memory (ROM) or a flash memory (both not shown), and random access memory (RAM), where the RAM generally refers to a main memory loaded with an operating system and application programs.

The computer system 1000 further includes a display interface 1030 (for example, a graphics processing unit), a display device 1040 (for example, a liquid crystal display), an audio interface 1050 (for example, a sound card) and an audio device 1060 (for example, a loudspeaker). The display device 1040 and the audio device 1060 are media devices for experiencing multimedia content.

The computer system 1000 generally includes one storage device 1070. The storage device 1070 may be selected from multiple computer readable media, where the computer readable medium refers to any available medium accessible through the computer system 1000, and includes a removable medium and an immovable medium. For example, the computer readable medium includes, but not limited to, a flash memory (micro SD card), a CD-ROM, a digital versatile disc (DVD) or other optical memories, a cassette, a magnetic tape, a disk storage or other magnetic storage devices, or any other media that can be used to store required information and can be accessed by the computer system 1000.

The computer system 1000 further includes an input device 1080 and an input interface 1090 (for example, an IO controller). A user may input an instruction and information into the computer system 1000 through the input device 1080, such as a keyboard, a mouse or a touch panel device on the display device 1040. The input device 1080 is generally connected to the system bus 1022 through the input interface 1090, and may also be connected through other interfaces or bus structures, such as a universal serial bus (USB).

The computer system 1000 may be logically connected to one or more network devices in a network environment. The network device may be a personal computer, a server, a router, a smart phone, a tablet computer or another public network node. The computer system 1000 is connected to the network device through a local area network (LAN) interface 1100 or a mobile communication unit 1110. The local area network (LAN) refers to an interconnected computer network in a limited area such as a family, a school, a computer laboratory, or an office building using network media. WiFi and twisted pair wired Ethernet are the most commonly used two techniques for building a local area network. WiFi is a technology that enables the computer systems 1000 to exchange data or to be connected to a wireless network through radio waves. The mobile communication unit 1110 is capable of making and receiving calls through radio communication line while moving in a board geographic area. In addition to calling, the mobile communication unit 1110 also supports Internet access in a 2G, 3G or 4G cellular communication system that provides mobile data services.

It should be noted that, other computer systems including more or less subsystems than the computer system 1000 are also applicable to the present application. For example, the computer system 1000 may include a Bluetooth unit capable of exchanging data in a short distance, an image sensor for capturing pictures, and an accelerometer for measuring the acceleration.

As described above in detail, the computer system 1000 applicable to the present application may execute assigned operations of the instant messaging method. The computer system 1000 executes these operations in the form of running software instructions in the computer readable media by the processor 1010. These software instructions may be read into the memory 1020 from the storage device 1070 or from another device through the local area network interface 1100. The software instructions stored in the memory 1020 enable the processor 1010 to execute the instant messaging method. Additionally, the present application may also be implemented through a hardware circuit or a combination of hardware circuit with the software instructions. Therefore, the implementation of the present application is not limited to the combination of any specific hardware circuit and software.

In some embodiments, a user of an instant messaging application may use a client device (e.g., a tablet) at a location (e.g., home) that has only Wi-Fi connection to access his/her user account. When the user leaves that location, he/she may want to access the same user account from a different device (e.g., a smartphone) that has cellular wireless connection. The switch between these two devices requires a synchronization of the display of instant messages on the smartphone such that the user may be able to view the instant messages on the smartphone in a more intuitive manner. As noted above, the server may keep track of information related to the instant messages associated with the user account in order to synchronize them between the two client devices.

Figure 8A:
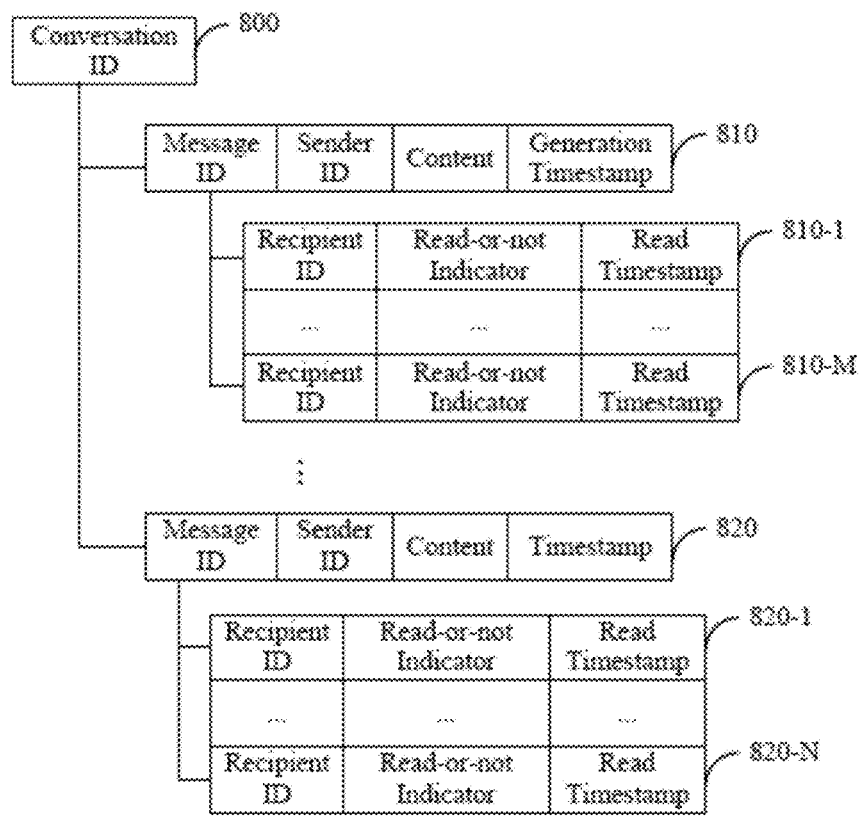
FIGS. 8A and 8B are block diagrams of data structures used by the computer system capable of implementing the other embodiment of the present application.
Figure 8B:
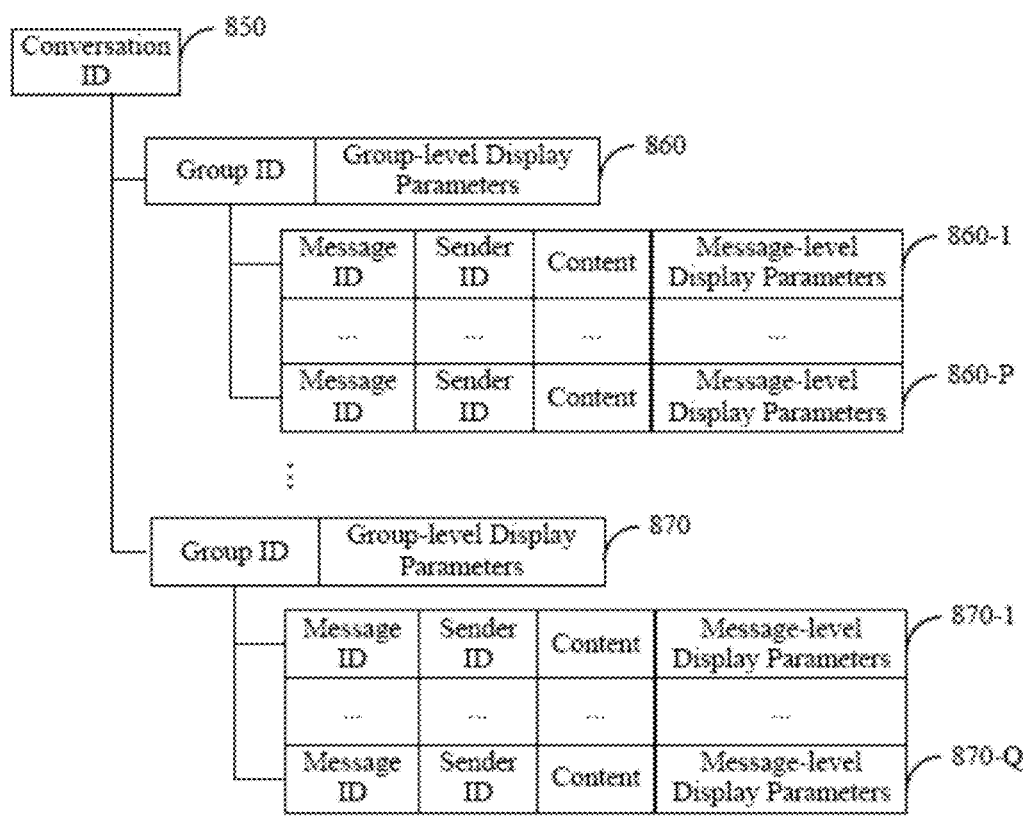

FIGS. 8A and 8B are block diagrams of data structures used by the computer system capable of implementing an embodiment of the present application. For example, FIG. 8A depicts a data structure for storing a conversation including instant messages exchanged between two or more participants of the conversation. This conversation data structure has a unique conversation ID 800. Associated with the conversation ID 800 are multiple instant messages 810 and 820. As shown in the figure, each instant message includes a message ID, a sender ID, content, and a generation timestamp indicating when the message is generated. For each message, there are one or more recipients, each recipient having an associated record (810-1, 810-M, 820-1, 820-M) including a recipient ID, a read-or-not indicator, and a read timestamp. The read-or-not indicator indicates whether the message has been read by its recipient. For example, a positive indicator suggests that the message has been read and a corresponding read timestamp is also recorded indicative of when the message was read. A negative indicator suggests the opposite and no read timestamp is thus recorded.

When the server receives a synchronization request, a new data structure like the one shown in FIG. 8B may be created to support the synchronization request. Like the one in FIG. 8A, the synchronization data structure also has a conversation ID 850 indicative of which conversation is to be synchronized. The to-be-synchronized messages associated with the conversation ID 850 are divided into one or more groups (860, 870) based on predefined criteria. For example, one of the criteria is that messages generated within a predefined time period are organized into a group. In some embodiments, the predefined time period may be dependent on the last message's timestamp at the to-be-synchronized client, the current timestamp and the total number of to-be-synchronized messages. For example, the group size may be defined such that the group contains no more than the number of messages that can be simultaneously shown on the display. Each group has one or more group-level display parameters, which will be described below in connection with FIG. 10. Within each group, there are one or multiple message records (860-1, 860-P for the group 860) and (870-1, 870-Q for the group 870). Each message record has a message ID, a sender ID, content, and one or more message-level display parameters, which will be described below in connection with FIG. 10.

Figure 9C:
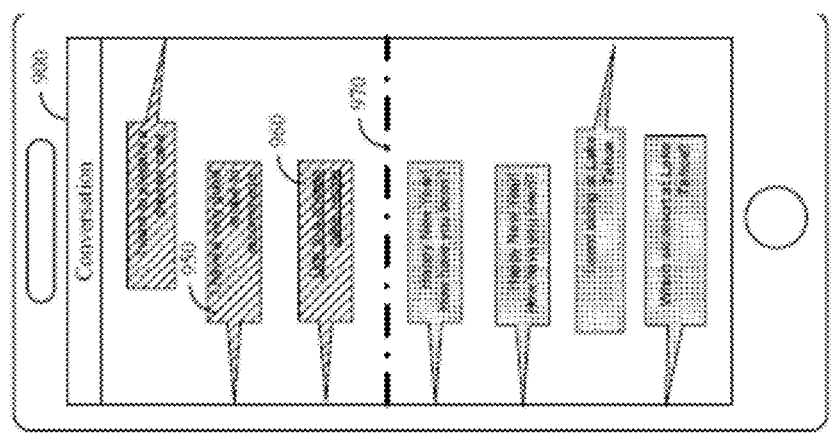
FIGS. 9A-9C are schematic diagrams of graphical user interfaces implementing the other embodiment of the present application.
Figure 9B:
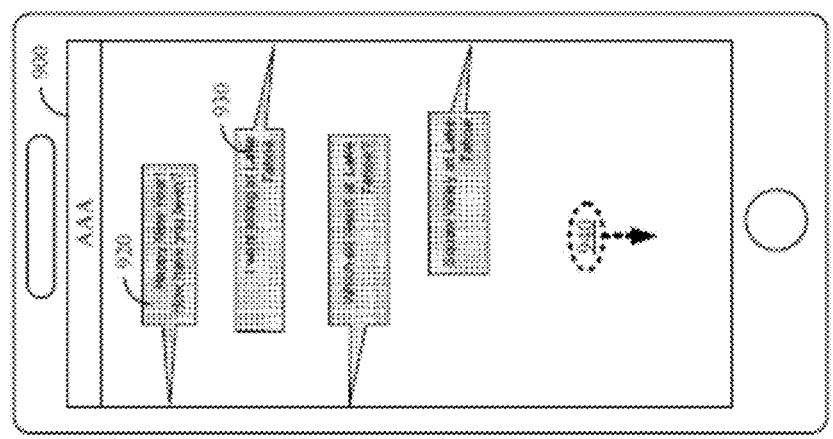
Figure 9A:
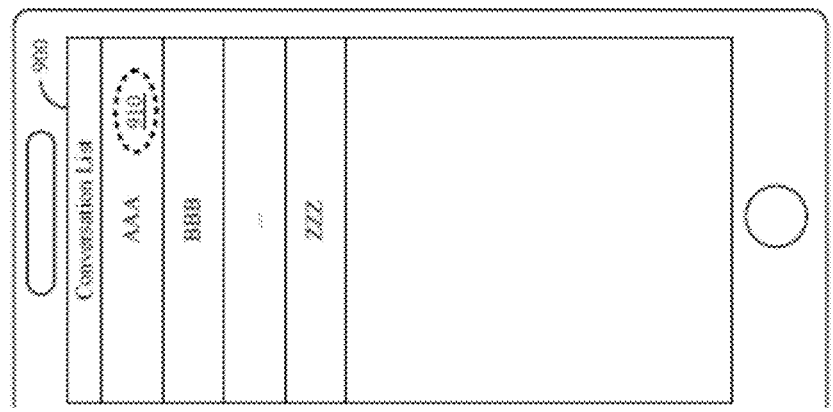
Figure 10:
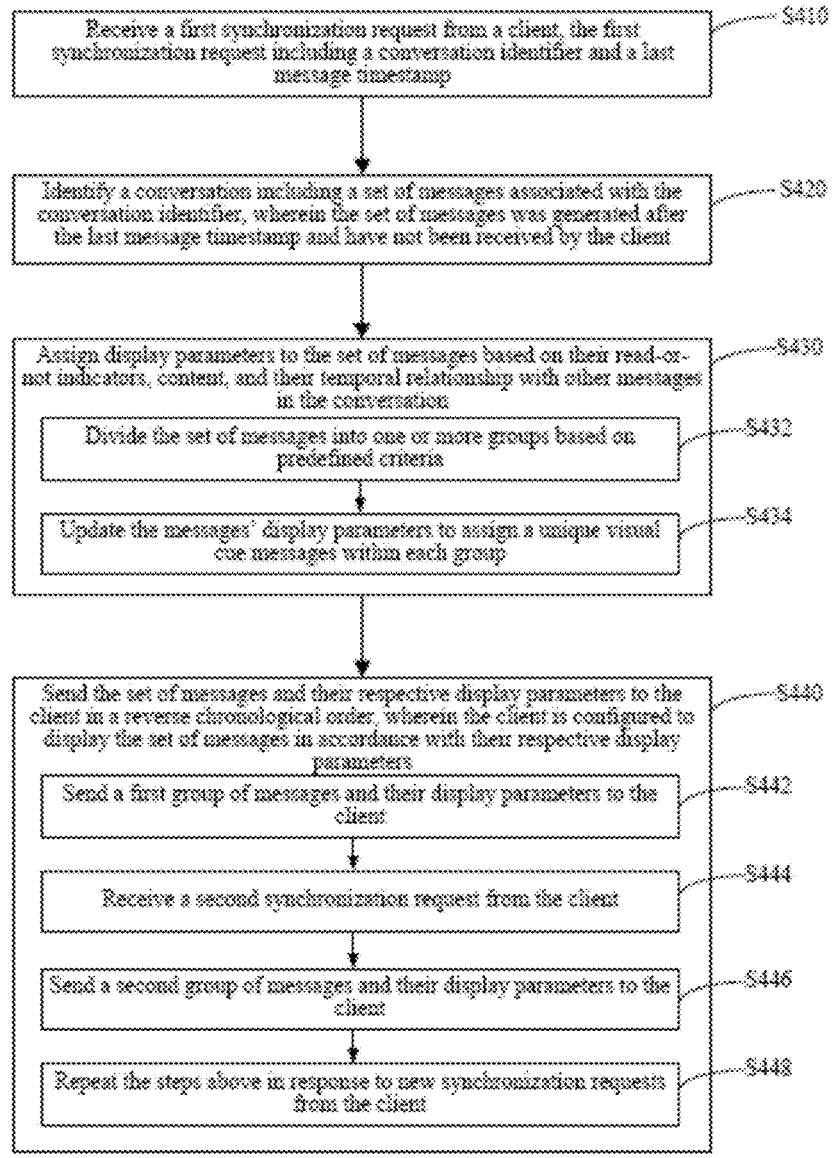
FIG. 10 is a schematic flow chart of a process performed by a computer system according to the other embodiment of the present application.

FIG. 10 is a schematic flow chart of a process performed by a computer system using the data structures as described above in connection with FIGS. 8A and 8B. As noted above, the computer system first receives (S410) a first synchronization request from a client (e.g., a smartphone from which the user is going to access his/her user account). In some embodiments, the first synchronization request is generated at the client in connection with a user account login request from the client. In some other embodiments, the first synchronization request is generated at the client in connection with a user access request associated with the conversation from the client after the user logs into its user account. FIG. 9A depicts a user interface 900 that includes a conversation list. The finger contact 910 indicates that the user wants to access the conversation "AAA." In response, the client sends the first synchronization request to the computer system. In some embodiments, the first synchronization request includes a conversation identifier and a last message timestamp. The conversation identifier is used by the computer system to search the conversation data structure shown in FIG. 8A for a particular conversation and the last message timestamp indicates when the client receives the last message from the computer system. Using such time information, the computer system can prepare the data structure shown in FIG. 8B for the messages to be synchronized with the client. In some embodiments, the last timestamp is replaced with the last message identifier and the computer system then finds out when the last message was generated.

As shown in FIG. 10, the computer system identifies (S420) a conversation including a set of messages associated with the conversation identifier. The set of messages was generated after the last message timestamp and have not been received by the client. Next, the computer system assigns display parameters to the set of messages based on their read-or-not indicators, content, and their temporal relationship with other messages in the conversation. One reason for assigning different display parameters to different to-be-synchronized message is that the time gap between the last user access to his/her user account from a first client (e.g., the tablet at home) and the first user access to his/her user account (e.g., the smartphone) varies. By assigning different display parameters to different to-be-synchronized message, the computer system can customize the display of the messages in a more intuitive manner. As noted above, the computer system may divide (S432) the set of messages into one or more groups based on the predefined criteria and then update (S434) the messages' display parameters to assign a unique visual cue messages within each group. FIG. 9B depicts a group of synchronized messages in response to the first synchronization request. Note that a predefined shade style 920 is applied to the group messages indicating that these messages are related to each other. In this example, the computer system may perform a contextual analysis to the group of messages and identify the keyword "Lake Tahoe" 930 to be highlighted at the client. FIG. 9C depicts an update to the graphical user interface shown in FIG. 9B after the user applies a scroll gesture 940 on the touchscreen. In this case, a second group of messages are shown on the screen. Note that a different shade style 950 and a group separator 970 are used to visually distinguish the two groups of messages.

In some embodiments, the computer system checks the read-or-not indicators of messages within a particular group. When a message's read-or-not indicator is negative, the computer system updates the message's display parameter to assign a first visual cue to the message indicating that the message has not been read; when a message's read-or-not indicator is positive, the computer system updates the message's display parameter to assign a second visual cue to the message, distinct from the first visual cue, indicating that the message has been read. As shown in FIG. 9C, the message 960 is a document link to another message or document. It is underlined to show that the user has not selected the document link yet, which is deemed to have not been read by the user. In other words, the underline is removed after the user selection of the document link.

Next, the computer system sends (S440) the set of messages and their respective display parameters to the client in a reverse chronological order. The client is configured to display the set of messages in accordance with their respective display parameters. As shown in FIGS. 9A-9C, the computer system sends (S442) a first group of messages and their display parameters to the client in response to the first synchronization request triggered by the finger contact 910. After receiving (S444) a second synchronization request triggered by the scroll gesture 940 from the client, the computer system sends (S446) a second group of messages and their display parameters to the client. As shown in FIG. 9C, the second group of messages were generated before the first group of messages in the conversation. This reverse chronological order is to avoid synchronizing the old messages that the user may not be interested in viewing on the client and therefore save the bandwidth and battery power for other purposes. However, the computer system repeats (S448) the steps above in response to new synchronization requests from the client until it returns the last group of messages that need to be synchronized to the client.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of synchronizing the display of instant messages between multiple clients, the method comprising:

at a computer server system having one or more processors and memory for storing programs to be executed by the one or more processors, wherein the computer server system is communicatively connected to the multiple clients:

receiving a first synchronization request from a client, the first synchronization request including a conversation identifier, a last message timestamp, corresponding information of a latest message stored in the client and quantity of messages requested to be synchronized;

in response to the first synchronization request and without any further user input from the client:

identifying a conversation including a set of messages associated with the conversation identifier according to the quantity of messages requested to be synchronized and a time gap between a last timestamp of a last user access to the conversation from a first client and a current timestamp at the client, wherein the set of messages was generated after the last message timestamp and have not been received by the client;

performing a contextual analysis to the set of messages to extract a set of keywords from the set of messages and automatically dividing the set of messages into at least two groups of messages including a first group of messages and a second group of messages that were generated prior to the first group of messages in the conversation base on one or more parameters associated with the set of messages and the extracted set of keywords, wherein each group of messages are related to a unique topic associated with at least a respective one of the extracted set of keywords; and assigning (1) message-level display parameters to the set of messages based on their read-or-not indicators, content, and their temporal relationship with other messages in the conversation and (2) group-level display parameters to the at least two groups of messages respectively; and sending the first group of messages, their respective message-level display parameters, and a first group-level display parameter of the first group of messages to the client, wherein the client is configured to display the first group of messages in accordance with their respective message-level display parameters and the first group-level display parameter, wherein the first group of messages are displayed in a reversed chronological order according to their respective generation times, and wherein the corresponding information of the latest message stored in the client is a message Identity (ID);

receiving a second synchronization request subsequent to the first synchronization request from the client;

in response to the second synchronization request and without any further user input from the client:

sending the second group of messages, their respective message-level display parameters, and a second group-level display parameter of the second group of messages to the client, wherein the client is configured to display the second group of messages in accordance with their respective message-level display parameters and the second group-level display parameter distinct from the first group-level display parameter and separate the second group of messages from the first group of messages by a group separator for visually distinguishing the two groups of messages related to different keyword-based topics.

2. The method of claim 1, wherein the first synchronization request is generated at the client in connection with a user account login request from the client.

3. The method of claim 1, wherein the first synchronization request is generated at the client in connection with a user access request associated with the conversation from the client after the user logs into its user account.

4. The method of claim 1, wherein assigning the group-level display parameters to the at least two groups of messages further includes:

updating the group-level display parameters to assign different shades to the at least two groups of messages respectively.

5. The method of claim 4, wherein assigning the message-level display parameters to the set of messages further includes:

checking the read-or-not indicators of messages within a particular group;

updating a message's display parameter to assign a first visual cue to the message indicating that the message has not been read when the message's read-or-not indicator is negative; and updating a message's display parameter to assign a second visual cue to the message, distinct from the first visual cue, indicating that the message has been read when the message's read-or-not indicator is positive.

6. The method of claim 4, wherein the message-level display parameters of a message further include one or more keywords to be highlighted in the message.

7. The method of claim 1, wherein identifying a conversation including a set of messages associated with the conversation identifier comprises:

obtaining the latest message stored in the client according to the corresponding information of a latest message stored in the client; and determining the set of messages that needs to be sent to the client according to the first synchronization request, the latest message stored in the client and a latest message stored in the computer system.

8. A computer system, wherein the computer system is communicatively connected to multiple clients, the computer server system comprising:

one or more processors;

memory; and one or more program modules stored in the memory, wherein the one or more program modules include instructions to be executed by the one or more processors, the instructions further including:

receiving a first synchronization request from a client, the first synchronization request including a conversation identifier, a last message timestamp, corresponding information of a latest message stored in the client and quantity of messages requested to be synchronized;

in response to the first synchronization request and without any further user input from the client:

identifying a conversation including a set of messages associated with the conversation identifier according to the quantity of messages requested to be synchronized and a time gap between a last timestamp of a last user access to the conversation from a first client and a current timestamp at the client, wherein the set of messages was generated after the last message timestamp and have not been received by the client;

performing a contextual analysis to the set of messages to extract a set of keywords from the set of messages and automatically dividing the set of messages into at least two groups of messages including a first group of messages and a second group of messages that were generated prior to the first group of messages in the conversation base on one or more parameters associated with the set of messages and the extracted set of keywords, wherein each group of messages are related to a unique topic associated with at least a respective one of the extracted set of keywords; and assigning (1) message-level display parameters to the set of messages based on their read-or-not indicators, content, and their temporal relationship with other messages in the conversation and (2) group-level display parameters to the at least two groups of messages respectively; and sending the first group of messages, their respective message-level display parameters, and a first group-level display parameter of the first group of messages to the client, wherein the client is configured to display the first group of messages in accordance with their respective message-level display parameters and the first group-level display parameter, wherein the first group of messages are displayed in a reversed chronological order according to their respective generation times, and wherein the corresponding information of the latest message stored in the client is a message Identity (ID);

receiving a second synchronization request subsequent to the first synchronization request from the client;

in response to the second synchronization request and without any further user input from the client:

sending the second group of messages, their respective message-level display parameters, and a second group-level display parameter of the second group of messages to the client, wherein the client is configured to display the second group of messages in accordance with their respective message-level display parameters and the second group-level display parameter distinct from the first group-level display parameter and separate the second group of messages from the first group of messages by a group separator for visually distinguishing the two groups of messages related to different keyword-based topics.

9. The computer system of claim 8, wherein the first synchronization request is generated at the client in connection with a user account login request from the client.

10. The computer system of claim 8, wherein the first synchronization request is generated at the client in connection with a user access request associated with the conversation from the client after the user logs into its user account.

11. The computer system of claim 8, wherein the instruction for assigning the group-level display parameters to the at least two groups of messages further includes:

updating the group-level display parameters to assign different shades to the at least two groups of messages respectively.

12. The computer system of claim 11, wherein the instructions for assigning the message-level display parameters to the set of messages further includes:

checking the read-or-not indicators of messages within a particular group;

updating a message's display parameter to assign a first visual cue to the message indicating that the message has not been read when the message's read-or-not indicator is negative; and updating a message's display parameter to assign a second visual cue to the message, distinct from the first visual cue, indicating that the message has been read when the message's read-or-not indicator is positive.

13. The computer system of claim 11, wherein the message-level display parameters of a message further include one or more keywords to be highlighted in the message.

14. The computer system of claim 8, wherein identifying a conversation including a set of messages associated with the conversation identifier comprises:

obtaining the latest message stored in the client according to the corresponding information of a latest message stored in the client; and determining the set of messages that needs to be sent to the client according to the first synchronization request, the latest message stored in the client and a latest message stored in the computer system.

15. A non-transitory computer readable storage medium storing one or more program modules, the one or more program modules comprising instructions, which, when executed by one or more processors of a computer server system that is communicatively connected to multiple clients, cause the processors to perform operations including:

receiving a first synchronization request from a client, the first synchronization request including a conversation identifier, a last message timestamp, corresponding information of a latest message stored in the client and quantity of messages requested to be synchronized;

in response to the first synchronization request and without any further user input from the client:

identifying a conversation including a set of messages associated with the conversation identifier according to the quantity of messages requested to be synchronized and a time gap between a last timestamp of a last user access to the conversation from a first client and a current timestamp at the client, wherein the set of messages was generated after the last message timestamp and have not been received by the client;

performing a contextual analysis to the set of messages to extract a set of keywords from the set of messages and automatically dividing the set of messages into at least two groups of messages including a first group of messages and a second group of messages that were generated prior to the first group of messages in the conversation base on one or more parameters associated with the set of messages and the extracted set of keywords, wherein each group of messages are related to a unique topic associated with at least a respective one of the extracted set of keywords; and assigning (1) message-level display parameters to the set of messages based on their read-or-not indicators, content, and their temporal relationship with other messages in the conversation and (2) group-level display parameters to the at least two groups of messages respectively; and sending the first group of messages, their respective message-level display parameters, and a first group-level display parameter of the first group of messages to the client, wherein the client is configured to display the first group of messages in accordance with their respective message-level display parameters and the first group-level display parameter, wherein the first group of messages are displayed in a reversed chronological order according to their respective generation times, and wherein the corresponding information of the latest message stored in the client is a message Identity (ID);

receiving a second synchronization request subsequent to the first synchronization request from the client;

in response to the second synchronization request and without any further user input from the client:

sending the second group of messages, their respective message-level display parameters, and a second group-level display parameter of the second group of messages to the client, wherein the client is configured to display the second group of messages in accordance with their respective message-level display parameters and the second group-level display parameter distinct from the first group-level display parameter and separate the second group of messages from the first group of messages by a group separator for visually distinguishing the two groups of messages related to different keyword-based topics.

16. The non-transitory computer readable storage medium of claim 15, wherein identifying a conversation including a set of messages associated with the conversation identifier comprises:

obtaining the latest message stored in the client according to the corresponding information of a latest message stored in the client; and determining the set of messages that needs to be sent to the client according to the first synchronization request, the latest message stored in the client and a latest message stored in the computer system.

\* \* \* \* \*